Oct. 31, 1961  C. U. DEATON  3,006,019
OVERHEAD ILLUMINATOR GRIDS
Filed July 20, 1956  4 Sheets-Sheet 1

INVENTOR.
CHARLES U. DEATON
BY
ATTORNEY

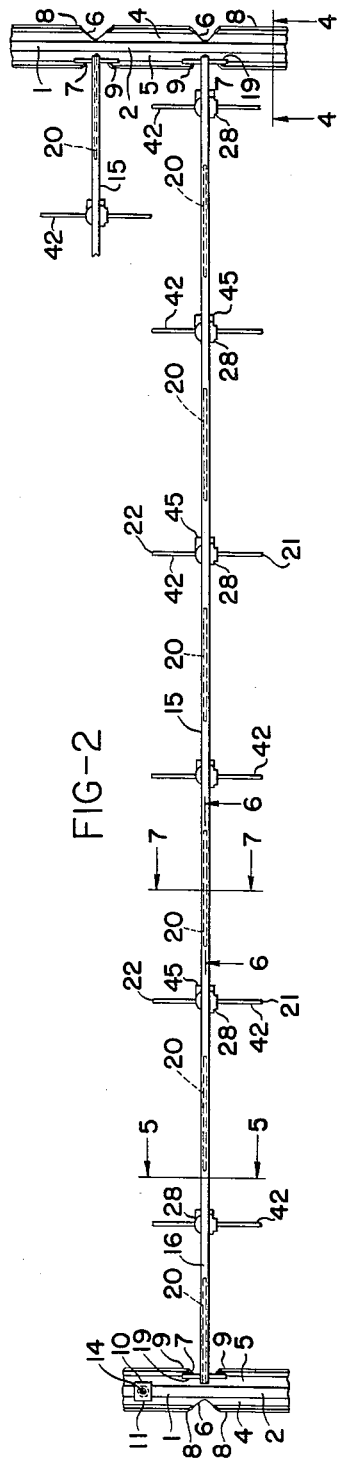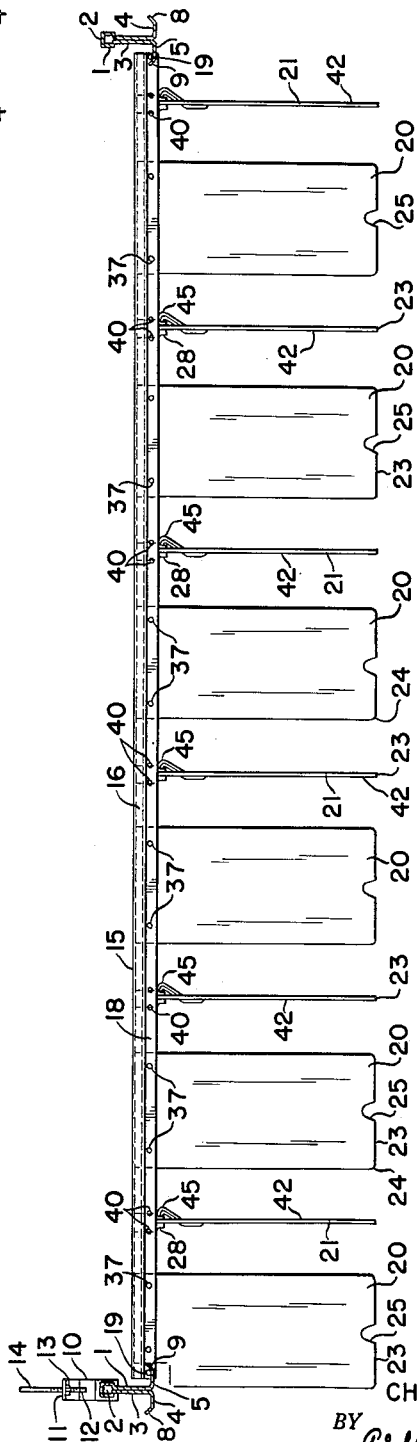

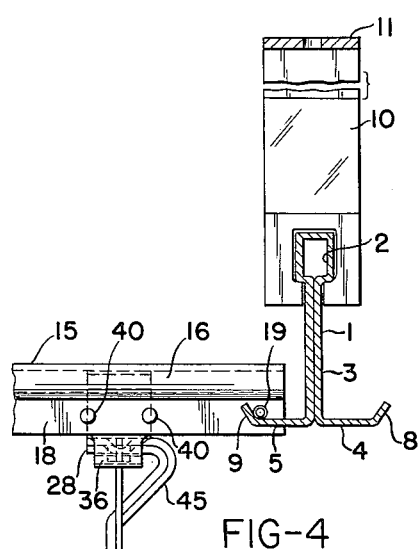
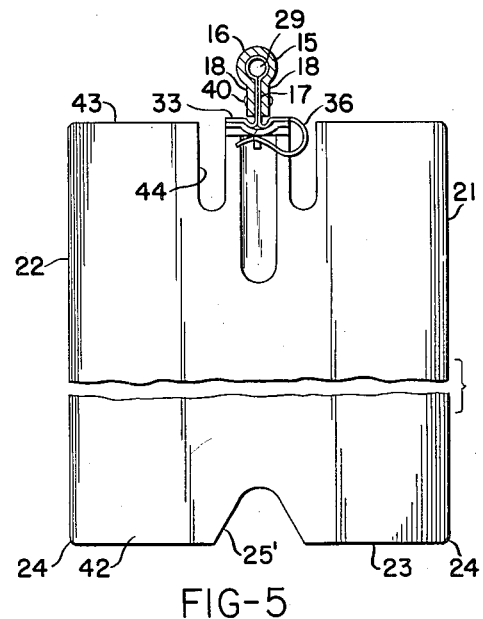
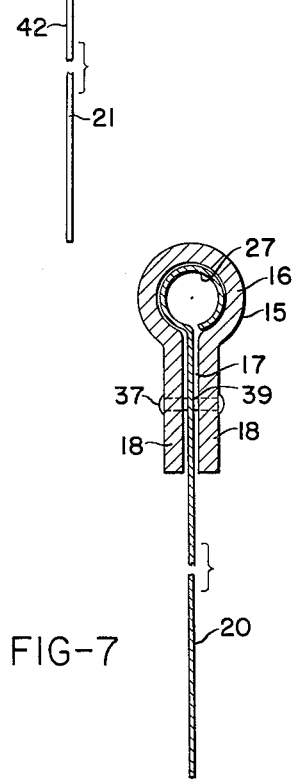
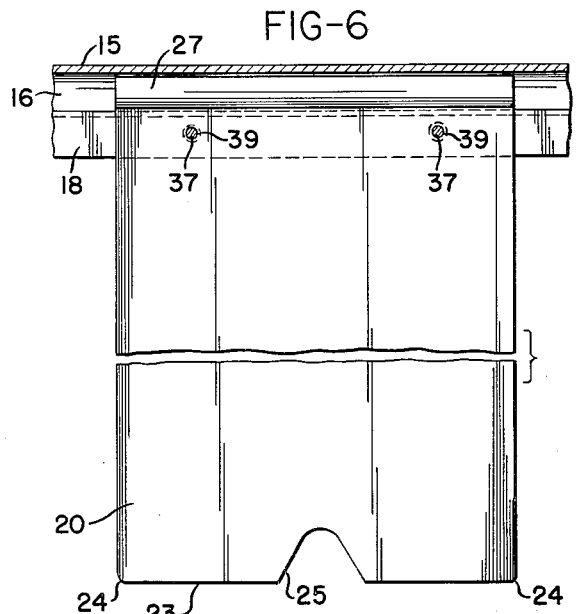

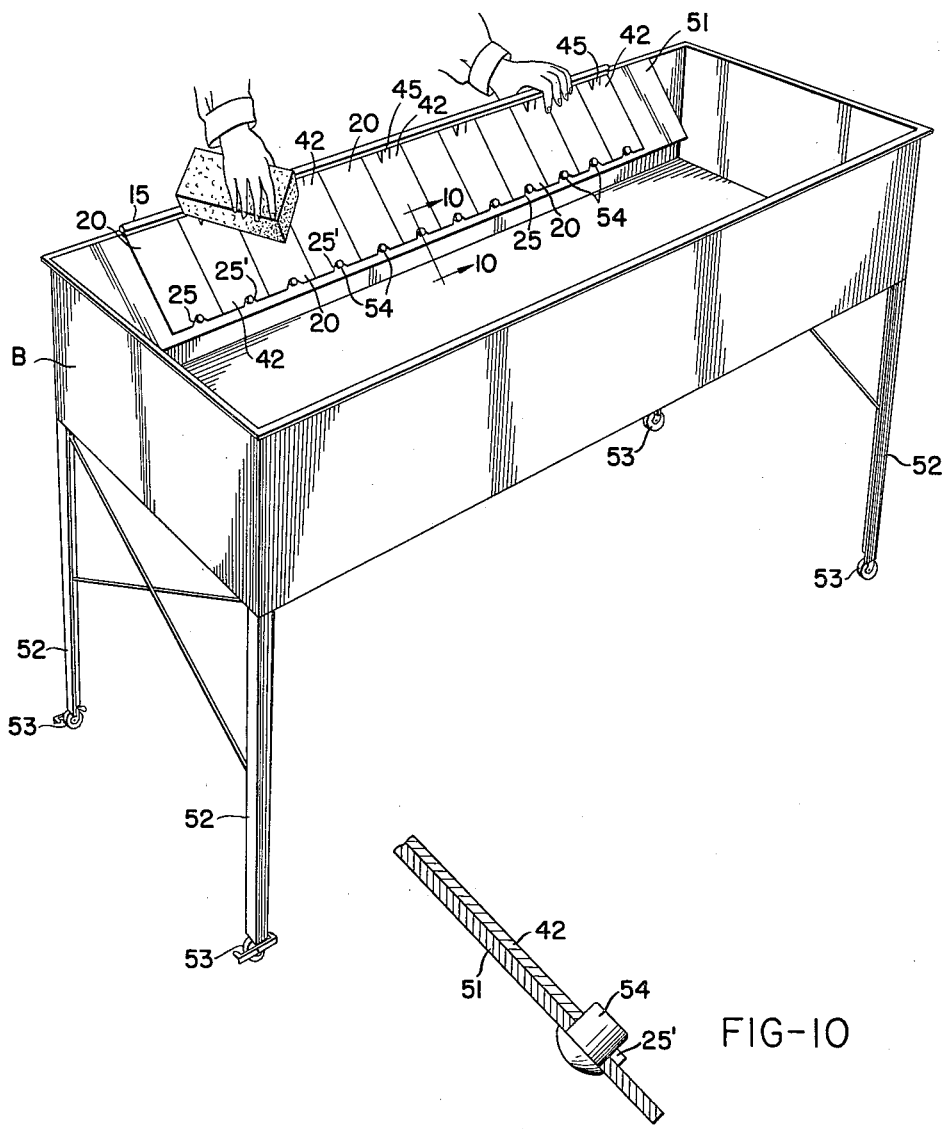

3,006,019
OVERHEAD ILLUMINATOR GRIDS
Charles U. Deaton, 805 Central Bank Bldg.,
Denver 2, Colo.
Filed July 20, 1956, Ser. No. 599,169
7 Claims. (Cl. 15—268)

This invention relates in general to certain new and useful improvements in overhead illuminator grids and, more particularly, to certain unique light-diffusing devices adapted for efficiently transmitting a high percentage of the light rays generated at the light source while at the same time effectively masking the light-source from view.

Overhead illuminator grids are used in conjunction with various types of light sources either across the bottom of individual lighting fixtures or as an overall ceiling installation disposed beneath illuminators mounted directly on the ceilings. Conventional structures of this type are either of the "egg-crate" or the "cell" type and in both types the thin vertical elements are tightly interlocked in a deep cellular configuration which is very difficult to clean.

It is, therefore, the primary object of the present invention to provide an overhead illuminator grid which can be quickly and conveniently cleaned.

It is another object of the present invention to provide a unique type of overhead illuminator grid which is simple and economical in cost and highly attractive in appearance.

It is a further object of the present invention to provide an overhead illuminator grid which can be readily disassembled, reassembled, mounted and demounted with a minimum of time and effort.

It is also an object of the present invention to provide means for cleaning overhead illuminator grids of the type stated.

With the above and other objects in view, my invention resides in the novel features of form, construction, arrangement, and combination of parts presently described and pointed out in the claims.

In the accompanying drawings—

FIGURE 1 is a fragmentary perspective view of an overhead illuminator grid constructed in accordance with and embodying the present invention;

FIGURES 2 and 3 are fragmentary sectional views taken along lines 2—2 and 3—3, respectively, of FIGURE 1;

FIGURES 4, 5, 6 and 7 are fragmentary sectional views taken along lines 4—4, 5—5, 6—6 and 7—7 respectively of FIGURE 2;

FIGURE 9 is a perspective view of the grid-washing tub forming a part of the present invention; and FIGURE 10 is a fragmentary sectional view taken along line 10—10 of FIGURE 9.

Figures 1, 8:
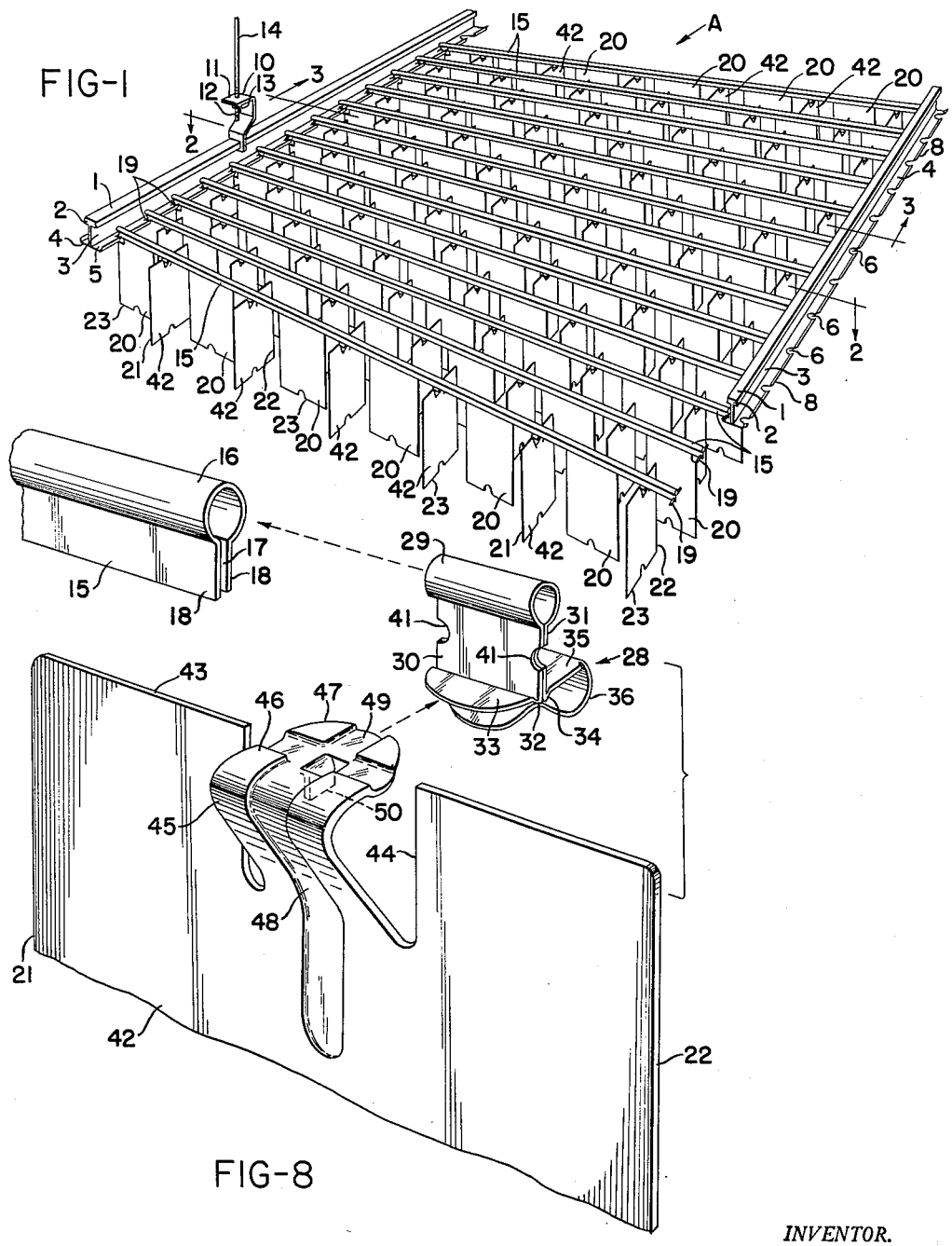
FIGURE 8 is an exploded perspective view illustrating the manner of assembly of a single light-baffle, and attachment clip, and supporting-rod forming a component of the present invention.

Referring now in more detail and by reference characters to the drawings, which illustrate a preferred embodiment of the present invention, A designates an overhead illuminator grid comprising a plurality of spaced parallel hanger-bars 1 preferably formed of sheet metal and integrally including a tubular rail-element 2, a flat web-element 3 and lateral flanges 4, 5, respectively provided with uniformly spaced V-shaped notches 6, 7. Intermediate each of the notches 6 are obliquely upturned lips 8 and likewise intermediate each of the notches 7 are obliquely upturned lips 9. At suitably spaced intervals the hanger-bars 1 are supported from the ceiling or other conventional superstructure by mounting-clips 10 which slideably engage the rail-elements 2 and are provided at their upper ends with flanges 11 adjustably engaged by the lower threaded end 12 and nut 13 of a vertical rod 14 substantially as shown in FIGURE 1.

Provided for transverse disposition between each adjacent pair of hanger-bars 1, is a tubular supporting rod 15 formed of sheet metal or extruded-section and integrally including a channel-portion 16 of substantially circular cross-section opening downwardly into a narrow slot 17 formed between two closely spaced flat flanges 18. At each end the supporting rods 15 are provided with transverse pins 19 which extend through the flanges 18 and straddle the slots 6, 7, as shown in FIGURE 2 whereby to hold the supporting rods 15 removably between the hanger-bars 1, to form a light-weight but nevertheless sturdy frame-work substantially as shown in FIGURE 1.

Mounted at uniformly spaced intervals along each supporting rod 15 are light-baffles or panels 20 formed of thin metallic sheet material such as aluminum or a synthetic plastomer such as a polymerized polyvinyl sheet. The surfaces of the aluminum sheets can be anodized to produce a soft diffused reflection of light or can be colored to produce a variety of decorative effects. Similarly plastic sheets of opaque or translucent character and of a variety of colors may readily be employed. Each light-baffle 20 is rectilinear in shape having parallel, normally vertical edges 21, 22, and a normally horizontal bottom edge 23 preferably joined to the edges 21, 22, by rounded corners 24 and being provided with a medial notch 25. The other or upper margin 26 of each light-baffle 20 is provided with somewhat tubular bead 27 sized to fit snugly but nevertheless slidably within the channel portions 16 of the supporting rods 15. In this connection it should be noted that the space between each light-baffle 20 is slightly greater than the width thereof.

Similarly formed to fit slidably within the channel portion 16 and between the flanges 18 is a clip 28 formed of spring metal and integrally including a tubular head-element 29 and facewise abutting web-forming elements 30, 31. The lower margin of the web-forming element 30 is bent upwardly in the formation of a semi-circular bead 32 and then outwardly in the provision of an arcuate flange 33. The lower margin of the web-forming element 31 is also bent upwardly in the formation of a semicircular bead 34 and then outwardly in the provision of a flange 35 which terminates in a reversely bent spring 36. One clip 28 is slid into the supporting rod 15 and located midway between each of the light-baffles 20, as illustrated in FIGURE 8. Thus, it will be apparent that each supporting rod is made up into an assembly by sliding an appropriate number of light-baffles 20 and spring clips 28 into place. Once this has been done the spacing can be rendered permanent by inserting rivets 37 through suitably formed apertures 39 in the light-baffles 20 and similar rivets 40 through semicircular marginal niches 41 in the clips 28. It should, of course, be understood that partial punching, bonding, upsetting or any other suitable method for staking the light-baffles 20 and clips 28 may be employed.

Provided for each of the clips 28 is a light-baffle or panel 42 substantially similar in all respects to the previously described light-baffles 20 and having notches 25' identical with the notches 25. The upper transverse margins 43 of the light-baffles 42 are centrally stamped out in the formation of a U-shaped recess 44 which is somewhat wider than the widest dimension of the flanges 33, 35, so that the light-baffle 42 can be turned about a vertical axis when inserted in the clip 28, as will be presently more fully pointed out. Formed integrally with and extending upwardly from the bottom margin of the recess 44 is an angularly bent tab 45 which extends up to the plane of the top margin 43 and is bent inwardly in such plane to form a lip 46 having an arcuate margin 47 presented through the recess 44. The tab 45 and lip 46 are mutually provided with an arcuate groove or corrugation 48 and the lip 46 is also provided with a similar additional groove or corrugation 49 extending at right angles to the corrugation 48, both corrugations 48, 49, being of such size and shape as to effect snap-fitting engagement with the combined beads 32, 34, of the clip 28. Finally, the lip 46 is provided with a downwardly struck ear 50 adapted to abut against the flat lateral margin of the flanges 33, 35, when the light-baffle 42 is turned within the clip 28 so that the upper horizontal portion of the corrugation 48 is engaged by the beads 32, 34, as best seen in FIGURES 4 and 5. As illustrated in FIGURE 8, one light-baffle 42 is inserted in each clip 28 and turned 90° so that each supporting rod 15, when suspended in operative position between two hanger-bars 1, will have alternate light-baffles 20, 42 which are respectively perpendicular to each other as shown in FIGURES 2 and 3. When a plurality of supporting rods 15 are suspended in parallel relation between hanger-bars 1 the overhead illuminator grid A is formed as shown in FIGURE 1 in which the light-baffles 20 of adjacent supporting rods 15 are staggered so that the light-baffles 42 are presented facewise to the vertical edges of the light-baffles 20 of the same supporting rod 15 and, contrariwise, such light-baffles 42 are presented edgewise to the faces of the light-baffles 20 of adjacent supporting rods 15.

When the grid A needs cleaning, each supporting rod 15 can be quickly lifted and removed from between the hanger-bars 1. The light-baffles 42 are then manually turned or "shingled" so to speak, into the plane of the light-baffles 20 so as to present a substantially continuous flat surface which can be easily wiped-off or dusted. If the light-baffles 20, 42 are in need of washing, the supporting rod 15 and its assembled light-baffles 20, 42 can be laid flatwise upon a flat apron 51 of a washing tub B, the latter being of generally rectangular shape and being supported upon legs 52 having conventional casters 53 preferably of the step-brake type. The apron 51 is provided with a plurality of uniformly spaced upstanding pins 54 which respectively engage the notches 25, 25' and serve to position as well as support the light-baffles 20, 42 upon the apron 51 as shown in FIGURE 9.

It should be understood that changes and modifications in the form, construction, arrangement, and combination of the several parts of the overhead illuminator grids may be made and substituted for those herein shown and described without departing from the nature and principle of my invention.

Having thus described my invention, what I claim and desire to secure by Letters Patent is:

1. The combination with a light ray baffle comprising a frame adapted for mounting to a rigid object, a rod-like element removably mounted on said frame, and a plurality of thin panels of substantially identical shape mounted in spaced relation upon said rod-like element, each of said panels being mutually orthogonal to its adjacent panels and substantially half of said panels being in substantial parallelism with the longitudinal axis of said rod-like element, the other half of said panels being substantially perpendicular to the longitudinal axis of said rod-like element, said panels which are perpendicular to said rod-like element being mounted thereon by a plurality of spring clips, said spring clips being provided with means for aligning the panels which are perpendicular to said rod-like element into parallel relationship therewith, said panels being provided along their lower margins of notches, of a tub means for washing said panels while mounted on the rod-like element, said tub means having an inclined plate in the upper portion thereof for supporting the rod-like element and panels associated therewith so that the latter may be conveniently washed and cleaned.

2. The combination with a light ray baffle comprising a frame adapted for mounting to a rigid object, a rod-like element removably mounted on said frame, and a plurality of thin panels of substantially identical shape mounted in spaced relation upon said rod-like element, each of said panels being mutually orthogonal to its adjacent panels and substantially half of said panels being in substantial parallelism with the longitudinal axis of said rod-like element, the other half of said panels being substantially perpendicular to the longitudinal axis of said rod-like element, said panels which are perpendicular to said rod-like element being mounted thereon by a plurality of spring clips, said spring clips being provided with means for aligning the panels which are perpendicular to said rod-like element into parallel relationship therewith, said panels being provided along their lower margins with notches, of a tub means for washing said panels while mounted on the rod-like element, said tub means having an inclined plate in the upper portion thereof, said plate having a plurality of upstanding pins sized and located to engage the notches for supporting the rod-like elements and panels associated therewith so that the latter may be conveniently washed and cleaned.

3. The combination with a light ray baffle comprising a frame adapted for mounting to a rigid object, a rod-like element removably mounted on said frame, and a plurality of thin panels of substantially identical shape mounted in spaced relation upon said rod-like element, each of said panels being mutually orthogonal to its adjacent panels and substantially half of said panels being in substantial parallelism with the longitudinal axis of said rod-like element, the other half of said panels being substantially perpendicular to the longitudinal axis of said rod-like element, said panels which are perpendicular to said rod-like element being mounted thereon by a plurality of spring clips, said spring clips being provided with means for aligning the panels which are perpendicular to said rod-like element into parallel relationship therewith, said panels being provided along their lower margins with notches, of a tub means for washing said panels while mounted on the rod-like element, said tub means having an inclined plate in the upper portion thereof, said plate having means sized and located to engage the notches for supporting the rod-like element and panels associated therewith so that the latter may be conveniently washed and cleaned.

4. The combination of a light ray baffle comprising a frame adapted for mounting to a rigid object, a rod-like element removably mounted on said frame, and a plurality of thin panels of substantially identical shape rotatably mounted in spaced depending vertical relation upon said rod-like element in such manner as to swivel about its vertical centerline, said panels along said rod-like element being so positioned that the distance between the vertical centerlines of adjacent panels is greater than the horizontal width of the panels whereby alternate panels along each rod-like element can be optionally rotated into a plane which is perpendicular to the longitudinal axis of the rod-like element so that such rotated panels are mutually orthogonal to adjacent panels for diffusion of light and said rotated panels can also be rotated back into coplanar alignment with the non-rotated panels for simplicity in cleaning and washing of a tub means for washing said panels while mounted on the rod-like element, said tub means having an inclined plate in the upper portion thereof for supporting the rod-like element or panels associated therewith.

5. A light ray baffle according to claim 4 further characterized in that the means of attachment between the rod-like element and the panels comprises a depending clip formed of spring metal and integrally including a pair of facewise abutting substantially flat spring leaves which are integrally connected by an arcuate bight to form a substantially horizontal clamping element with a laterally presented opening, each of the panels being provided centrally of its upper margin with a laterally presented narrow tongue removably engageable within the clamping element.

6. A light ray baffle according to claim 4 in which the panels are rotatably mounted on the rod-like element by a plurality of spaced spring clips, said spring clips being provided with means for aligning the panels in such perpendicular position in relation to said rod-like element.

7. A light ray baffle according to claim 5 in which at least one of the abutting faces of the clip has a positioning boss and the tongue has a positioning groove engageable with said boss to hold the panel in perpendicular relation to the longitudinal axis of the rod-like element.

References Cited in the file of this patent

UNITED STATES PATENTS

| | | |
|---|---|---|
| D. 182,991 | Deaton | June 10, 1958 |
| 562,949 | Casler | June 30, 1896 |
| 1,419,918 | Champeau | June 20, 1922 |
| 2,527,031 | Rambusch | Oct. 24, 1950 |
| 2,604,159 | Wright | July 22, 1952 |
| 2,698,071 | Lee | Dec. 28, 1954 |
| 2,822,584 | Urbain | Feb. 11, 1958 |

FOREIGN PATENTS

| | | |
|---|---|---|
| 1,016,986 | France | Sept. 10, 1952 |